United States Patent
Anderson

(10) Patent No.: US 9,680,651 B2
(45) Date of Patent: Jun. 13, 2017

(54) SECURE DATA SHREDDING IN AN IMPERFECT DATA STORAGE DEVICE

(71) Applicant: Seagate Technlogy LLC, Cupertino, CA (US)

(72) Inventor: William Erik Anderson, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 248 days.

(21) Appl. No.: 14/524,823

(22) Filed: Oct. 27, 2014

(65) Prior Publication Data

US 2016/0119146 A1   Apr. 28, 2016

(51) Int. Cl.
| | | |
|---|---|---|
| H04L 29/06 | (2006.01) | |
| G06F 21/00 | (2013.01) | |
| H04L 9/32 | (2006.01) | |
| H04L 9/08 | (2006.01) | |
| G06F 3/06 | (2006.01) | |
| G06F 17/30 | (2006.01) | |
| G06F 21/62 | (2013.01) | |
| H04L 9/30 | (2006.01) | |

(52) U.S. Cl.
CPC ............ *H04L 9/3242* (2013.01); *H04L 9/085* (2013.01); *H04L 9/0869* (2013.01); *H04L 9/0894* (2013.01); *H04L 9/30* (2013.01); *H04L 2209/24* (2013.01)

(58) Field of Classification Search
CPC ....... H04L 9/3242; H04L 9/30; H04L 9/0869; H04L 2209/24; H04L 9/0894
See application file for complete search history.

(56) References Cited

U.S. PATENT DOCUMENTS

| | | |
|---|---|---|
| 5,608,801 A | 3/1997 | Aiello et al. |
| 7,653,197 B2 | 1/2010 | Van Dijk |
| 7,933,905 B2 | 4/2011 | Obana et al. |
| 8,037,518 B2 | 10/2011 | Buer |

(Continued)

FOREIGN PATENT DOCUMENTS

| | | | |
|---|---|---|---|
| WO | 2007/036763 A1 | 4/2007 | |
| WO | WO 2016148738 A1 * | 9/2016 | ....... G06F 17/30082 |

OTHER PUBLICATIONS

Katerina Argyraki, Suhas Diggavi, Melissa Duarte, Christina Fragouli, Marios Gatzianas, Panagiotis Kostopoulos; "Creating secrets out of erasures"; Sep. 2013; MobiCom'13: Proceedings of the 19th annual international conference on Mobile computing & networking; Publisher: ACM; pp. 429-439.*

*Primary Examiner* — Mohammad W Reza
*Assistant Examiner* — Courtney Fields
(74) *Attorney, Agent, or Firm* — Hall Estill Attorneys at Law

(57) ABSTRACT

Apparatus and method for secure data shredding in an imperfect data storage device. In some embodiments, a hash function is applied to multi-bit random sequence to generate an output hash. A combinatorial logic function logically combines the output hash with a secret to provide an output value. The random string is processed into a plurality of secret shares which are stored in a first location in a non-volatile memory and the output value is stored in a different, second location of the memory. The secret is subsequently shredded by applying an erasure operation upon the secret shares in the first location of the memory.

20 Claims, 10 Drawing Sheets

(56) References Cited

U.S. PATENT DOCUMENTS

| | | |
|---|---|---|
| 8,059,816 B2 | 11/2011 | Bai |
| 8,397,051 B2 | 3/2013 | Beaman et al. |
| 2006/0218176 A1 | 9/2006 | Sun Hsu et al. |
| 2009/0217385 A1 | 8/2009 | Teow et al. |
| 2010/0215175 A1* | 8/2010 | Newson .............. G06F 21/6218 380/44 |
| 2010/0218037 A1 | 8/2010 | Swartz et al. |
| 2013/0305057 A1* | 11/2013 | Greco .................... G06F 21/80 713/189 |

* cited by examiner

ROTATABLE MEMORY

SOLID-STATE MEMORY

DATA WRITE

DATA READ

DATA SHRED

LARGE DATA SET PROCESSING

DATA WRITE (LARGE DATA SET)

DATA READ (LARGE DATA SET)

DATA SHRED (LARGE DATA SET)

SECURE DATA SHREDDING CONTAINER

US 9,680,651 B2

SECURE DATA SHREDDING IN AN IMPERFECT DATA STORAGE DEVICE

SUMMARY

Various embodiments of the present disclosure are generally directed to the secure shredding of data in an imperfect data storage device.

In some embodiments, a hash function is applied to a multi-bit random string to generate an output hash. A combinatorial logic function logically combines the output hash with a secret to provide an output value. The random string is processed into a plurality of secret shares which are stored in a first location in a non-volatile memory and the output value is stored in a different, second location of the memory. The secret is subsequently shredded by applying an erasure operation upon the secret shares in the first location of the memory.

In other embodiments, an apparatus includes a hash function block which applies a selected hash function from a family of universal hash functions to a multi-bit string of random numbers to generate a multi-bit output hash. A combinatorial logic block applies a selected combinatorial logic function to logically combine the output hash with a multi-bit secret to provide a multi-bit output value. A secret share module divides the string of random numbers into a plurality of secret shares. A write block directs storage of secret shares in a first location of a non-volatile memory and storage of the output value to a different, second location of the non-volatile memory. A data shredding block directs an erasure operation upon at least a portion of the secret shares in the first location of the memory to shred the secret from the memory without applying an erasure operation upon the output value in the second location of the memory.

In further embodiments, an apparatus includes a non-volatile memory, a read/write circuit configured to write data to and to read data from the non-volatile memory, and a data manager. The data manager circuit is configured to encode a multi-bit secret for storage to the memory, and includes a hash function block which applies a selected hash function from a family of universal hash functions to a multi-bit random string to generate a multi-bit output hash; a combinatorial logic block which applies a selected combinatorial logic function to logically combine the output hash with the multi-bit secret to provide a multi-bit output value; a secret sharing module which processes the random string into plural secret shares; a write block which directs the read/write circuit to store the secret shares in a first location of the memory and to store the output value to a different, second location of the memory; and a data shredding block which directs the read/write circuit to execute an erasure operation upon the secret shares in the first location of the memory to shred the secret from the memory.

These and other features which characterize various embodiments of the present disclosure can be understood in view of the following detailed discussion and the accompanying drawings.

DETAILED DESCRIPTION

Figure 1:
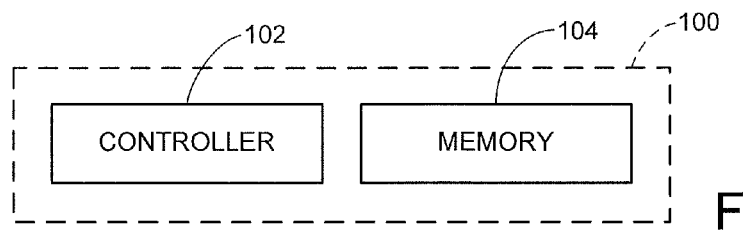
FIG. 1 is a functional block representation of a data storage system which operates in accordance with various embodiments of the present disclosure.

Data security schemes are used to reduce or eliminate unwanted access to data by unauthorized users of digital data storage systems. Data security schemes can employ a variety of security techniques in an effort to protect data.

One such technique is sometimes referred to as secure erasure, where steps are taken in an effort to securely erase data stored in a memory so as to generally prevent an unauthorized attacker from gaining access to the data.

In an ideal (perfect) data storage device, data could be securely erased through the simple expedient of applying a single erasure operation to the memory location at which the data are stored, thereby resetting the memory to a pristine state and removing all traces of the previously programmed data. In the real world, however, a single erasure operation upon a previously programmed non-volatile memory location will almost always leave traces of the previously programmed state of the memory. Indeed, the application of multiple erasure operations, including operations that alternately write new dummy data onto the memory locations between successive erasures, often fails to remove all traces of the previous programming state.

One reason why it is difficult to securely erase a non-volatile memory relates to the construction of the memory itself. Rotatable magnetic recording media (e.g., magnetic discs) used in hard disc drives (HDDs) use a magnetic write field to write data to tracks. Residual magnetization patterns (from the written tracks and/or from adjacent tracks) can be detected and decoded using sophisticated laboratory techniques to recover a previously stored data set, even if multiple overwrites have taken place. The original signature may be "masked" by additional overlaid signatures, but a motivated attacker can often isolate and recover at least portions of the original signature.

Erasable solid state memories such as flash memory arrays used in solid state drives (SSDs) store data by accumulating discrete quanta of charge on individual memory cells. An erasure operation is generally required to remove the accumulated charge to return the cells to an initial reset state. As with rotatable media, the charge signatures of previously programmed states of flash memory cells can be detected using sophisticated analysis techniques even after multiple program/erase cycles have been applied, and these charge signatures can be used to reconstruct a previously stored data set.

Other types of memories, such as rewritable solid-state memories (e.g., spin-torque transfer random access memory, resistive random access memory, ferromagnetic random access memory, phase change memory, etc.) similarly provide residual signatures after an erasure that can leak information to a motivated attacker regarding a previous storage state.

Another reason why it is difficult to securely erase data is that erasure mechanisms, while usually effective, are not absolutely 100% effective every time. Apart from the residual signatures that may be present even if an erasure operation is successfully carried out, there is an additional, albeit very small, probability at any given time that a particular erasure operation applied to a set of data will not actually alter the programmed states of the memory locations of the data.

For example, a direct current (DC) erase may be commanded to reset the data bits along a given track on a magnetic recording medium, or a garbage collection operation may be initiated to reset an erasure block of flash memory cells back to an initial reset state. Due to logic failures, voltage fluctuations, etc., the memory locations may not actually be erased (or completely erased) even though the system reports that the erasure was successful.

A third reason why it is difficult to perform a secure erasure of data relates to block failures in a memory. Block failures relate to the fact that regions of memory, once written, may "fail" such that the data stored thereon cannot be successfully accessed by the data storage system. Block failures may arise due to a variety of reasons such as wear, contamination, damage, grown defects that arise over time, etc.

Thus, at any given time, an erasure may be commanded for a particular block (e.g., track, erasure block, etc.), but due to a block failure the data storage device cannot access that block. The problem with this is that while the data storage device cannot access the block, a motivated attacker may be able to physically access the memory directly and, through laboratory examination of the memory, determine the data state of the block. Experience shows that the probability of blocks failing in a real-world data storage device is clearly greater than zero.

Thus, while a number of governmental and industry groups have promulgated standards for performing secure erasure of confidential data, at present the existing state of the art is insufficient to ensure that a given data set has indeed been securely erased and is not recoverable from an operable data storage device due to various factors such as residual signatures, erasure mechanism failures and block failures.

Accordingly, various embodiments of the present disclosure are directed to the secure shredding of data in an operative data storage device. Successful data shredding, in the present context, means that an attacking party cannot extract information about the underlying (secret) data, even when residue data exists after a shredding operation has been performed. Stated another way, a set of data is shredded in the present context if the data set has been sufficiently altered such that the probability of determining the value of each data bit is substantially equal to the results of a coin-flip or random guess. The techniques embodied herein can be specifically tailored to take into account the probability distributions of residual signatures, erasure failures and block failures being encountered during the shredding process.

As explained below, various embodiments operate to securely store a multi-bit secret (secret data) in a non-volatile memory in such a way that the secret can be securely shredded in a fast and effective manner. In some embodiments, a hash function is applied to a multi-bit random string to generate a multi-bit output hash value. A combinatorial logic function, such as but limited to an exclusive-or (XOR) function, is used to logically combine the output hash value with the multi-bit secret to provide a multi-bit output value.

The random string is stored in a first location in a non-volatile memory, and the output value is stored in a second location in the non-volatile memory. The first and second locations may be immediately adjacent one another, or the respective locations may be distributed across different locations of the memory.

The secret is subsequently shredded by applying an erasure operation upon the multi-bit random sequence in the first location of the non-volatile memory. While an erasure operation can also be applied to the output data in the second location, such erasure is unnecessary. Even a partial erasure of the random sequence will be sufficient to prevent recovery of the original secret.

In some embodiments, a universal family of hashes is provided and a multi-bit parameterization value is used to select the applied hash function from the universal family of hashes. The parameterization value can also be stored in a third location in the memory and this third memory can also remain undisturbed during the data shredding operation.

For larger data sets, the secret can comprise an encryption key and the process further includes applying a cryptographic (e.g., encryption) function to the data set to generate ciphertext which is also stored in a selected location in the memory. The key is processed as described above and protected by erasing the random sequence.

Secret sharing techniques are employed to distribute the random string among different locations (that is, the first location constitutes a number of different discrete memory storage blocks). In some cases, an (N, M) secret sharing algorithm is selected such that the multi-bit random string is divided into N shares, where at least M (where M≤N) shares are required to fully retrieve the random number sequence and M−1 shares are insufficient to do so. In this way, at least the partial erasure of N−M+1 shares will result in the secure shredding of the secret. At the same time, the secret can still be recovered by the data storage device even if up to N−M shares experience a block failure.

Other features and advantages of various embodiments can be understood beginning with a review of FIG. 1 which provides a generalized functional block diagram of a data storage device 100.

The data storage device 100 includes a controller 102 and a memory module 104. The controller 102 is a hardware-based or programmable processor that provides top level control of the device 100. The memory module 104 comprises non-volatile memory such as but not limited to rotatable memory and/or solid-state memory.

The data storage device 100 can take any number of forms including a hard disc drive (HDD), a solid-state drive (SSD), a hybrid drive, an optical drive, a thumb drive, a memory card, integrated memory within an electronic device such as a computer, tablet, smart phone, appliance, work station, server, etc. The controller functionality can be incorporated directly into the memory module as desired.

Figure 2:
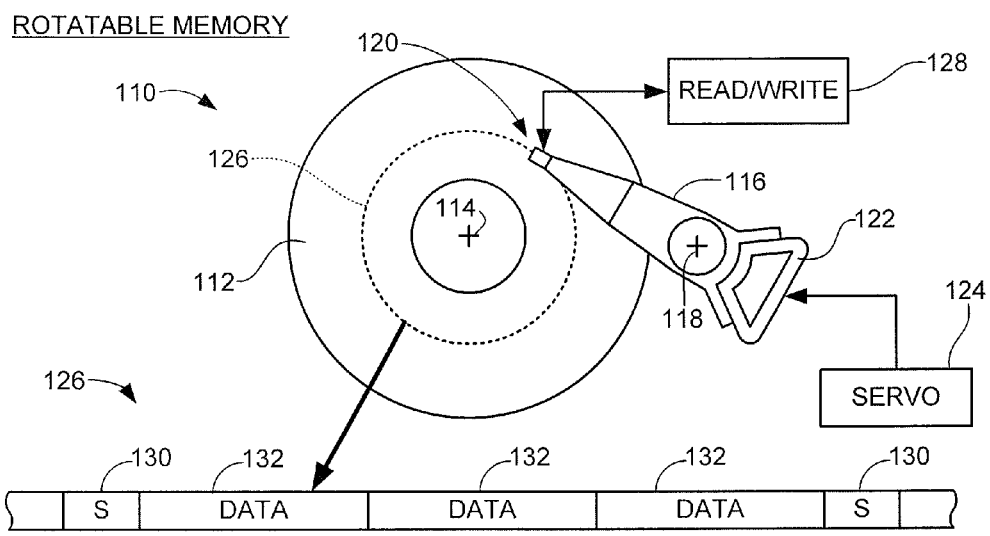
FIG. 2 shows a data storage device as in FIG. 1 configured with rotatable non-volatile memory to store data in accordance with some embodiments.

FIG. 2 depicts aspects of a data storage device 110 generally similar to the data storage device 100 of FIG. 1. The device 110 uses rotatable memory in the form of one or more rotatable magnetic recording media (discs) 112 which rotate about a central disc axis 114. An actuator 116 is disposed adjacent an outermost peripheral edge of the disc(s) 112 and pivots about a pivot point 118.

A read/write transducer, or head 120 is mounted at a first end of the actuator 116, and a voice coil 122 of a voice coil motor (not separately shown) is mounted at an opposing second end of the actuator. Controlled application of current to the voice coil 122 by a servo control circuit 124 induces controlled rotation of the actuator and hence, alignment of the head 120 with tracks defined on the media surfaces. One exemplary track is represented at 126. Write data to be written to the track 126 during a write operation are supplied to the head via a read/write circuit 128, and readback signals transduced by the head 120 during a read operation are recovered and processed by the circuit 128 to return the originally stored data.

The tracks 126 may take an embedded servo format as shown in FIG. 2 so that the media surfaces are provisioned with spaced apart servo data fields 130. The servo data fields 130 provide position control information to the servo control circuit 124 to enable closed-loop control of the head 120. Data blocks 132, such as in the form of fixed-sized addressable sectors, are stored along the tracks 126 between adjacent pairs of the servo fields 130. While three (3) data blocks 132 are shown in FIG. 2, any number of data blocks, including partial data blocks, may be provided between adjacent pairs of the servo fields 130.

While not limiting, it is contemplated that user data are stored in the data blocks (sectors) 132 from a host device. The data are stored using perpendicular magnetic recording techniques so that a write element of the head 120 applies a time varying bi-directional write field to the track 126 to write the data in perpendicular domains (e.g., perpendicular to the direction of travel of the head relative to the disc). Other recording techniques can be applied as well including heat assisted magnetic recording (HAMR), microwave assisted magnetic recording (MAMR), longitudinal recording, bit patterned media recording, discrete track media recording, shingled (e.g., partially overlapping) track recording, etc.

Figure 3:
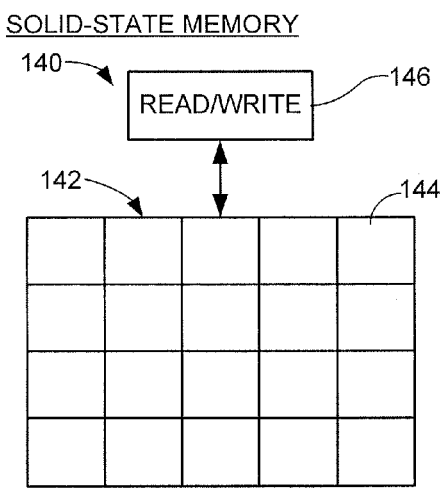
FIG. 3 shows a data storage device as in FIG. 1 configured with solid-state non-volatile memory cells to store data in accordance with further embodiments.

FIG. 3 depicts aspects of another data storage 140 generally similar to the data storage device 100 of FIG. 1. The device 140 uses solid-state non-volatile memory 142 arranged as rows and columns of semiconductor memory cells into storage blocks 144. A read/write circuit 146 includes x/y decoder circuitry, drivers and switching networks to direct write and read sense currents through the cells during respective write and read operations.

In some embodiments, the solid-state data storage device 140 is characterized as a flash memory device and the individual memory cells in the memory array 142 are flash memory cells. An example flash memory cell is depicted at 150 in FIG. 4A. The flash memory cell 150 includes a pair of spaced-apart N+ doped regions 152 in a semiconductor substrate 154. A gate structure spans the regions 152 and includes a conductive control gate (CG) 156 and a conductive floating gate (FG) 158. The gates 156, 158 are separated by intervening insulating layers 160, 162.

The flash memory cell 150 takes a general nMOSFET (n-channel metal oxide semiconductor field effect transistor) construction. The cell 150 can be programmed through the controlled accumulation of electrical charge onto the floating gate 158. The presence of charge on the floating gate 158 reduces the effective field strength generated by the application of voltage to the control gate 156. Hence, the higher the amount of accumulated charge on the floating gate 158, the higher the control gate voltage that needs to be applied to the control gate 156 to place the cell 150 in a source-drain conductive state (e.g., to flow current between the respective regions 152 through a channel region below the gate structure).

Programming the cell 150 to a selected programming state generally involves the application of a respective sequence of voltages to the cell to drive migration of electrons across boundary layer 1652 to the floating gate 158. A separate erasure operation is required to remove the accumulated charge from the floating gate 158 to reset the cell 150 to an initial erased state. The cell can take a single level cell (SLC) configuration where the cell stores a single bit (e.g., 1 in the erased state and 0 in the programmed state). Alternatively, the cell can take a multi-level cell (MLC) configuration where the cell stores multiple bits (e.g., 11 in the erased state and 10, 00 and 01 at progressively higher charge levels).

Figure 4A:
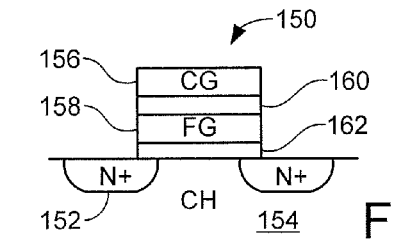
FIG. 4A depicts a flash memory cell of FIG. 3 responsive to characterization of the memory an erasable flash memory array.
Figure 4B:
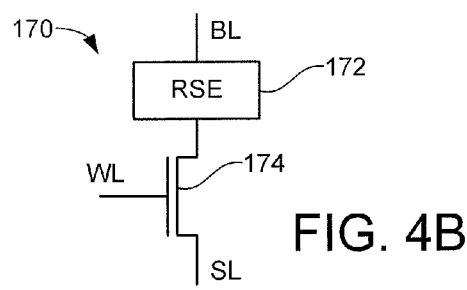
FIG. 4B depicts a resistive sense memory cell of FIG. 3 responsive to characterization of the memory as a rewritable resistive sense memory array.

FIG. 4B shows an alternative configuration for the semiconductor memory cells of the device 140 of FIG. 3. More particularly, FIG. 4B shows a resistive sense memory (RSM) memory cell 170 comprising a programmable resistive sense element (RSE) 172 and a switching device (e.g., MOSFET) 174. The RSE is a programmable module that can be programmed to different electrical resistances to denote different programmed states.

As with the flash memory cell 150 in FIG. 4A, the RSM cell 170 can be programmed as an SLC or an MLC as required. Control lines used to access the cell 170 include a bit line (BL), word line (WL) and source line (SL). A cross-point array can be used with a different switching device configuration so that only two lines (e.g., BL and SL) connect each cell.

The RSE 172 can take any number of configurations, such as one or more magnetic tunneling junctions (MTJs) in a spin-torque transfer random access memory (STRAM), a resistive random access memory (RRAM) programmable device that relies on ion/hole migration to effect different electrical resistances, a phase change random access memory (PCRAM) with the RSE constituting a phase-change material with different electrical characteristics from amorphous and crystalline states, etc.

At this point it will be recognized by those having skill in the art that each of the exemplary memories discussed in FIGS. 1-4B are non-volatile memory locations (e.g., cells, domains, etc.) readily adapted to store and retrieve user data. Securely erasing data previously stored to these and other types of non-volatile memories can be challenging due to residual signatures, erasure sequence failures and block failures.

Figure 5:
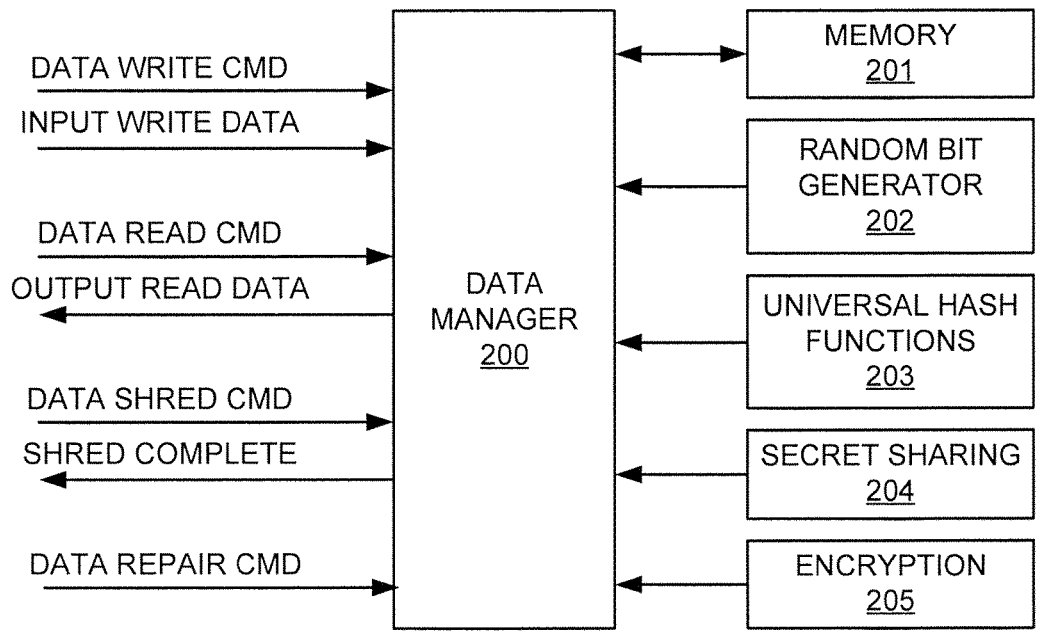
FIG. 5 is a functional block diagram of a data manager of the data storage device of FIG. 1 in accordance with some embodiments.

Accordingly, FIG. 5 provides a data manager module 200 that can be incorporated into each of the foregoing data storage devices 100, 110, 140 as required to carry out data shredding operations. The data manager 200 can take a variety of forms, including hardware, software and/or firmware. For example, at least certain operations of the data manager 200 can be realized using programming steps stored in a suitable memory and accessed by a programmable processor. Alternatively, the data manager may be realized using hardware, a specially configured system on chip (SOC) integrated circuit device, incorporated into the read/write channel circuitry, etc.

The data shredding operations performed by the data manager 200 generally operate to prevent, with a high degree of mathematical probability, the recovery of data from an associated non-volatile memory 201. It will be understood that the memory 201 can correspond to any of the memories discussed above. The data manager 200 operates in conjunction with a random bit generator 202, a universal hash function module 203, a secret sharing module 204 and an encryption module 205 as discussed below.

The data manager 200 can be incorporated into the read/write circuitry and/or the controller functionality of the storage device. The data manager 200 performs a variety of functions, but generally operates to process four (4) main types of commands: write commands, read commands, data shred commands and repair commands. As will be evident, the processing of write commands results in the writing of data to the memory 201, and the processing of read commands results in the readback (recovery) of the previously written data from the memory 201. A shred command results in the shredding of data written to the memory 201. Once shredded, neither the data manager 200 nor an attacking party will be able to recover the shredded data (again, within the mathematically defined constraints discussed above). A repair command repairs the data if bad blocks or other error conditions are detected.

Figure 6A:
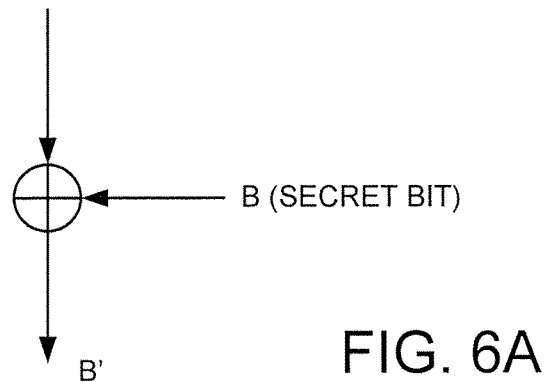
FIGS. 6A and 6B are flow sequences illustrating processing of a single bit of secret data to explain operation of the data manager in some embodiments.

In order to understand mechanisms employed by the data manager 200, reference is made to FIG. 6A which shows a single secret bit B. It is desirable to encode B in such a way that the logical value of the bit (0 or 1) is protected. For purposes of this illustration, an example media is assumed that can be written once and read many times, that each stored bit in the memory can only be subjected to an erasure operation once, and that the erasure operation has an extremely low probability of success, such as 1% (e.g., there is a probability of 0.99 that an erased bit has the same logical value after the erasure as before). Clearly this assumed media is a poor media indeed, but these characteristics help explain the processing employed by various embodiments disclosed herein.

In order to protect the single secret bit B, FIG. 6A shows the provision of a random string of bits R of selected length n. The string R is combined with the single bit B using an exclusive-or (XOR) combinatorial logic function to produce an output bit B'. The value of the output bit B' will be either a 0 or a 1 depending upon the random sequence of R.

Figure 6B:
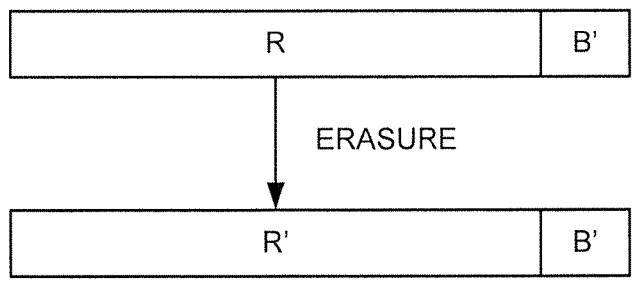

As shown in FIG. 6B, the process proceeds to store R and B' to the media. The original value of B can be easily recovered by applying the same combinatorial function to R and B'; the output of this operation will be the original value of B.

In order to securely shred B, an erasure operation is applied to the R bits stored on the media. The encoded bit B' remains unchanged and is not subjected to the erasure process. As noted above, the erasure operation is very poor, so that there is only about a 1% probability that each bit in R was in fact changed (reset) as a result of the erase operation.

The question becomes, how many bits should be in R in order to securely shred B? In other words, what is the minimum size of n such that the probability of an adversary A being able to guess the original state of B is essentially no greater than a coin-flip (e.g., 51% or less)?

In order to evaluate this, assume E represents the event where at least one of the bits of R (Ri) is erased. The probability of erasure Pr[E] is given as follows:

$$\Pr[E]=1-\epsilon, \text{ for some } \epsilon>0 \qquad (1)$$

It follows that the probability of A guessing B correctly (Pr[AB]) is based on the probability of A guessing correctly for those bits that were successfully erased (Pr[AB|E]) times the probability $(1-\epsilon)$, plus the probability of A guessing correctly for those bits that were not successfully erased (Pr[AB|!E]) times the probability $(\epsilon)$. This can be described as:

$$\Pr[AB]=\Pr[AB|E](1-\epsilon)+\Pr[AB|!E](\epsilon)$$

$$\leq \tfrac{1}{2}(1-\epsilon)+(\epsilon)$$

$$= \tfrac{1}{2}+\epsilon/2 \qquad (2)$$

From equation (2) it can be seen that the adversary A's advantage in distinguishing the value of B is determined by the value $\epsilon/2$. The ½ term in the equation is basically a 50-50 guess. The value of $\epsilon$ thus needs to be made small so that the overall probability is not much more than ½ (e.g., <51%).

Because $\epsilon$ is the probability that no bits are erased, It will be observed from equation (1) that:

$$\Pr[E]=1-\epsilon=1-(0.99)^n \qquad (3)$$

Solving for $n$ provides:

$$n=\log(\epsilon)/\log(0.99) \qquad (4)$$

Selecting $\epsilon$ to be 0.2, it follows that:

$$n=\log(0.2)/\log(0.99)=162 \qquad (5)$$

Thus, in this example it will take at least 162 bits of R to securely shred B in order to restrict A from guessing the original value of the secret bit B with a probability no greater than 0.51.

When dealing with real-world memories, it can be difficult to model physical erasures accurately due to a variety of factors including manufacturing variations, operational characteristics at the time of erasure (e.g., variations in heat, voltage, etc.), the effects of erasures that may have upon nearby storage cells, and the fact that an erased bit may not have a unique representation. In this latter case, for example, flash memory cells may provide erased bits with different amounts of residual charge due to incremental step pulse programming techniques used to apply and remove such charge.

Thus, information may leak as to the previous state of R after the erasure operation, and the straightforward technique of FIGS. 6A and 6B may not be sufficient to ensure secure shredding of the data due to these variations. Moreover, the technique of FIGS. 6A and 6B does not take into account the probability of block failures, which may leave data in the memory that cannot be shredded due to inability to access the data in the failed data blocks. Thus, the entropy of the erased bits in R' should be greater than the number of bits B being shredded in order to reduce the probability of recovering the secret B. Various embodiments accomplish this including through the application of a universal family of hash functions to R prior to being combined with the secret data B.

As will be recognized by those skilled in the art, a family of hash functions can be classified as universal if, for every unique hash function in the family, the probability of the output of that hash function for a first input being equal to the output of another hash function for a second distinct input is less than a defined mathematical constraint. A variety of universal hash functions are known in the art, and any number are suitable for use by the data manager 200 of FIG. 5.

Figure 7A:
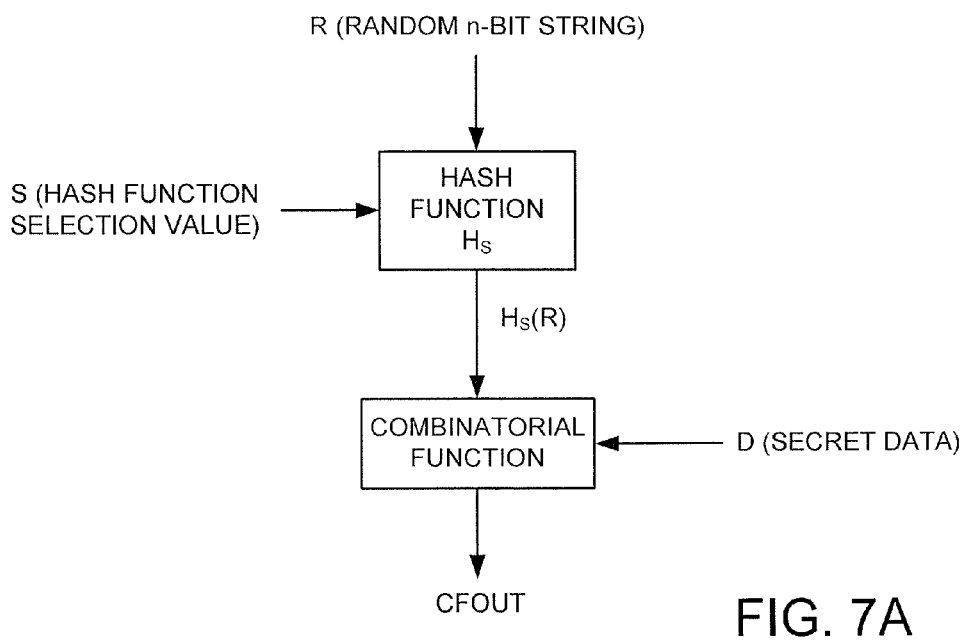
FIG. 7A is a flow sequence to illustrate processing of data by the data manager of FIG. 5.

As shown in FIG. 7A, secret data D represents a multi-bit string of logical values desired to be securely stored in the non-volatile memory 201 (FIG. 5). The value R is a multi-bit random string of length n. The value S is a parameterization value as a random sequence that identifies a selected one of the available hash functions in the universal family of hash functions. For example, if the family of hash functions has a total of 128 functions, then S can be a random seven (7) bit value with a magnitude of from 0 to 127. $H_s$ denotes the selected hash function based on S.

The selected hash function is applied to the input random string R to produce a hash output value $H_s(R)$. The hash output value is then combined with the secret data D using a selected combinatorial function, such as but not necessarily limited to an exclusive-or (XOR) function. The output of the combinatorial function is denoted as CFOUT.

Figure 7B:
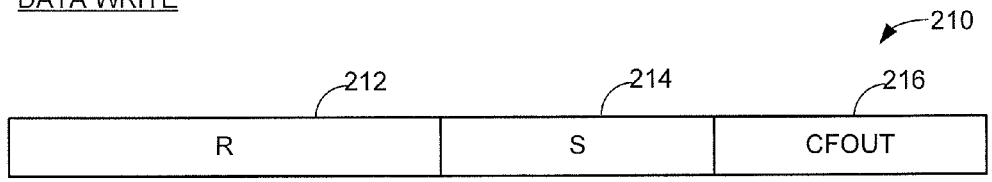
FIG. 7B is an exemplary format for data processed in FIG. 7A and written to a selected memory such as in FIGS. 1-3 during a write operation.

A data write operation is next carried out as represented in FIG. 7B. More generally, a data structure 210 is written to the non-volatile memory 201 (FIG. 5) comprising the R bits in a first memory locations 212, the S bits in a second memory location 214 and the CFOUT bits in a third memory location 216. The S and CFOUT bits can be in the same memory location as required. The respective locations 212, 214 and 216 can be immediately adjacent, such as in a single data sector 132 (FIG. 2) or a single page (row) of memory cells in a selected erasure block 144 (FIG. 3). Alternatively, the respective locations 212, 214 and 216 can be distributed to different locations in the memory 201. Although not shown, standard error correction and/or block erasure codes (ECC) can be generated and also stored to protect the respective R, S and CFOUT values against bit errors or block failures during subsequent processing.

Figure 7C:
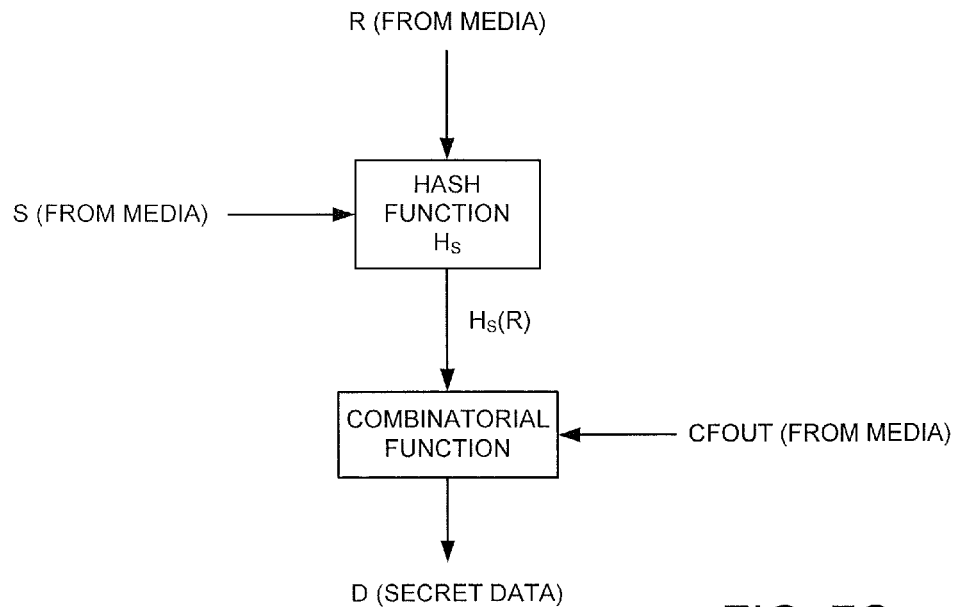
FIG. 7C is a flow sequence to illustrate processing of data by the data manager of FIG. 5 during a subsequent data read operation.

During a subsequent read operation to recover the originally stored secret data D, a read sequence is carried out as represented in FIG. 7C. The respective R, S and CFOUT values are retrieved from the memory 201. The S value is used to identify the selected hash function $H_s$, and the selected hash function is applied to the R value to regenerate the hash output value $H_s(R)$. The selected combinatorial function (e.g., XOR, etc.) is used to combine the hash output value $H_s(R)$ with the CFOUT value to recover the secret data D.

Figure 7D:
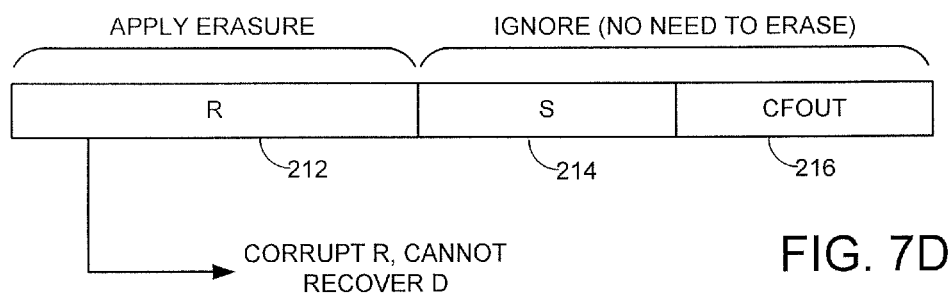
FIG. 7D depicts operation of the data manager during a subsequent data shredding operation in accordance with some embodiments.

The secret data D are securely shredded as represented in FIG. 7D. An erasure operation is applied to the first memory location 212 to erase the R data bits stored therein. Based solely on the corruption of the R data bits, the original secret data D cannot be successfully recovered. This is true even if some of the bits in R are not altered at all or only a partial erasure is applied to some of the R bits during the erasure operation.

There is no need to erase the S and CFOUT data bits in the memory locations 214, 216, although such an erasure can be applied as desired. Because of the use of the hash function, the underlying secret will appear to be random to the attacking party.

Hence, a single erasure operation upon R will be sufficient to shred D, although a multi-sequence erasure, including overwrites with random or cyclical data patterns, can be applied to the R bits as desired.

Figure 8:
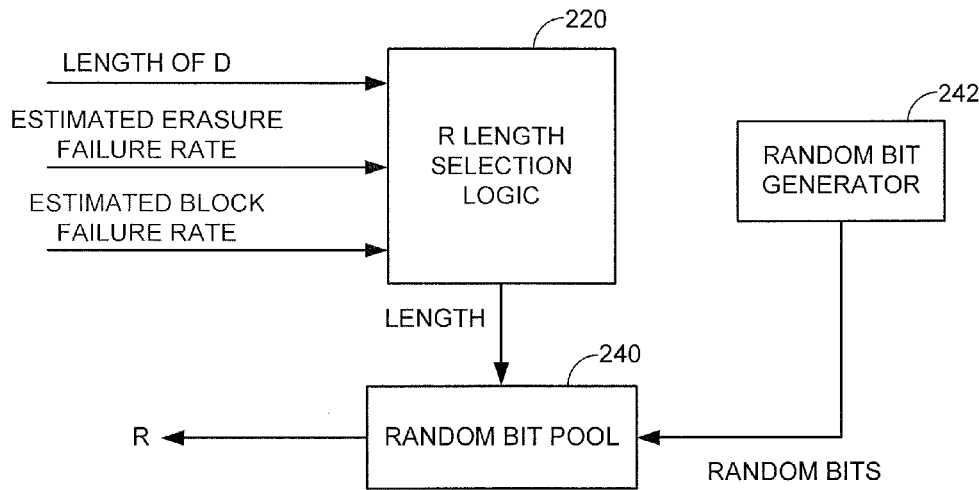
FIG. 8 depicts selection logic of the data manager to select various parameters used during the processing of FIGS. 7A-7D.

FIG. 8 shows a logic block 220 used to select appropriate lengths of R values. The logic block can form a portion of the data manager 200 of FIG. 5, or can be a standalone circuit that precalculates suitable lengths based on different circumstances.

The block 220 generally operates to select an appropriate length n of the multi-bit random bit sequence R. A number of criteria can be used in setting the length of R, including the corresponding length of the secret data D, and an estimated erasure distribution failure rate.

A mathematical basis can be employed by the logic block 220. In one example, assume that the length of the secret data D is 256 bits, the memory is a two-bit MLC flash memory with write once/read many capabilities, and each MLC has only one attempt at being erased with a distinguishing probability of σ% which is independent for each MLC. The distinguishing probability generally measures an adversary's ability to distinguish whether the cell was programmed to some non-zero value before an erase command.

The logic block 220 uses the generalized leftover hash lemma principle to determine the size of the random string R (in two-bit cells) such that the statistical distance Δ is less than or equal to a value of ϵ (see equation (2)) of $2^{-16}$, that is, $$\Delta \leq \varepsilon = \frac{1}{2}\sqrt{2^{-H_\infty(R|Erase(R))+m}} \qquad (6)$$

It can be shown that:

$$2^{-H_\infty(R|Erase(R))} \leq ((1+3\sigma)/4)^n \qquad (7)$$

which implies:

$$n = -(254 - 2\log(\epsilon))/\log((1+3\sigma)/4) \qquad (8)$$

where n in FIG. 6 is the number of MLC flash memory cells needed to store the R value. For clarity, since each MLC stores two bits, the total number of bits in R will be 2n in this example. It will be appreciated that this example does not take into account block failures.

Figure 9:
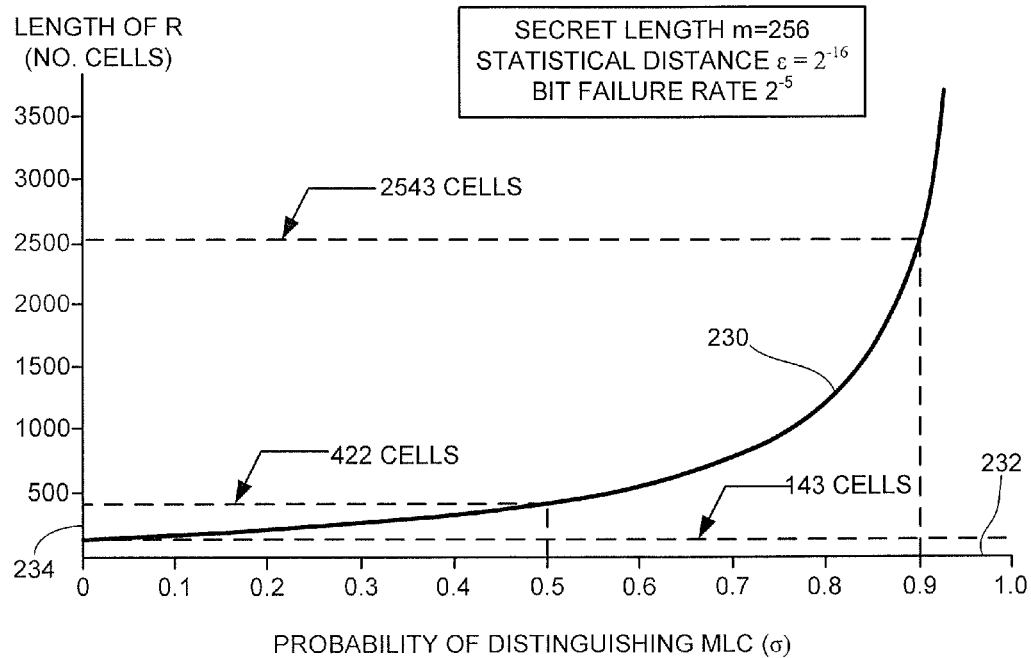
FIG. 9 is a graphical representation of a probability curve used during the selection of parameters in FIG. 8.

FIG. 9 shows a probability distribution curve 230 to plot the probability σ (from 0 to 1) of distinguishing whether a particular cell was programmed before erase and a y-axis 234 indicative of the overall length of R in terms of the number of MLC cells required to store the R value. A lower bound of the curve is set at 143 cells for R. A probability of 0.5 corresponds to a length of 422 cells, and a probability of 0.9 corresponds to a length of 2543 cells. Hence, in this example R might be set to at least 844 bits (2×422 cells) to protect the data secret of 256 bits with a probability level 6 of at most 0.5. In this way, the random string R has a total number of bits selected in relation to the average min-entropy of the random string given its residue after an erasure operation.

Other mechanisms can be used to select an appropriate length of the random sequence R so the above scheme is merely exemplary and is not limiting. Regardless of the selection methodology, it will be appreciated that the use of a universal family of hash functions can significantly enhance the efficiency of the process by reducing the overall length of R required for a given size of D while still facilitating secure shredding.

Returning again briefly to FIG. 8, once the selection logic block 220 has identified the appropriate number of bits for the random bit sequence R, the corresponding number of bits can be selected from a random bit pool 240 to output the appropriate R value. The random bit pool 240 can be generated in a variety of ways and generally provides an available set of random numbers for ready use by the system. In one embodiment, a random bit generator 242 can be used to generate a sequence of random bits (e.g., multi-bit random sequence). An entropy source and extractor can be used to seed the generator 242.

Figure 10:
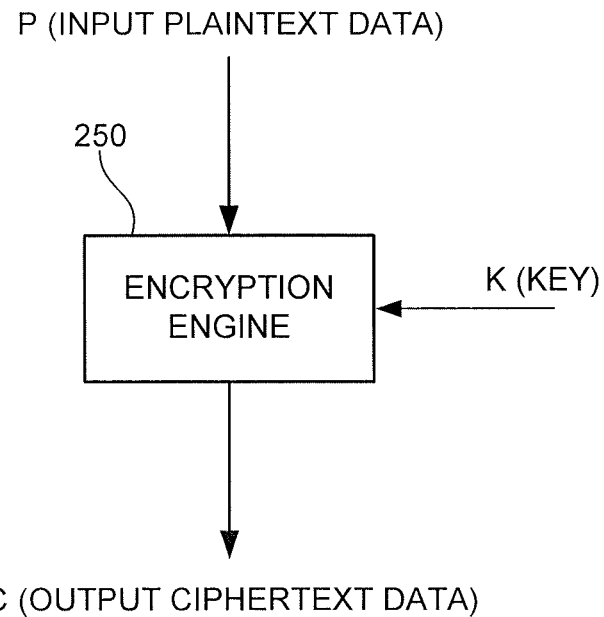
FIG. 10 is an encryption engine useful in accordance with some embodiments to provide secure data shredding for relatively large data sets.

The foregoing methodology of FIGS. 7A-9 can be used for any length of secret data D. Generally, R will tend to be longer than D so that as the size of the secret being protected (D) gets larger, the amount of overhead and computational processing required to protect D will also increase. To protect larger secrets, further cryptographic functionality may be added to the system. FIG. 10 illustrates an encryption engine 250 that can also be incorporated into the data manager 200 of FIG. 5. As before, the encryption engine 250 may be realized in hardware, software and/or firmware as desired.

Generally, the encryption engine utilizes a symmetric key K and a selected encryption function (block cipher) to transform input plaintext data P into output ciphertext data C. Any number of suitable encryption algorithms can be employed as desired.

To protect a large secret P, the key K is used to generate ciphertext C which is stored to the memory as will be described below. The encryption key K is thereafter treated as the secret data to be protected and ultimately shredded in a manner similar to that discussed above in FIGS. 7A-7D.

Figure 11A:
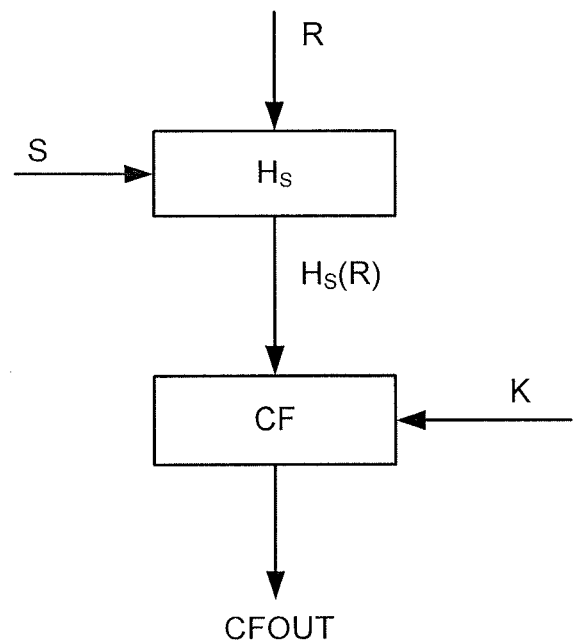
FIG. 11A is a flow sequence to illustrate processing of data by the data manager of FIG. 5 for such relatively large data sets.
Figure 11B:
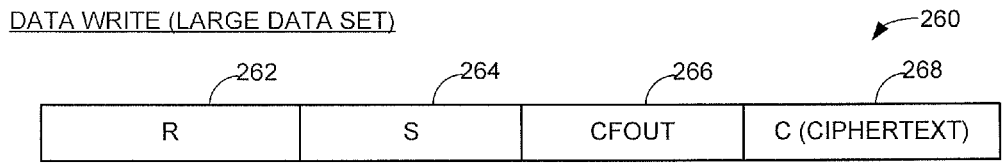
FIG. 11B is an exemplary format for data processed in FIG. 12 and written to a selected memory such as in FIGS. 1-3 during a write operation.

As shown by FIG. 11A, suitable values of R and S are selected in relation to K, and processed using a selected hash function and combinatorial logic function to produce CFOUT. These respective values form a data structure 260 (FIG. 11B) so that the R random bits are stored in a first memory location 262, the S random bits are stored in a second memory location 264, the CFOUT hash value is stored in a third memory location 266 and the ciphertext C is stored in a fourth memory location 268. As before, these may be adjacent or distributed throughout the memory 201 (FIG. 5). These respective values can be stored in the same memory location.

Figure 11C:
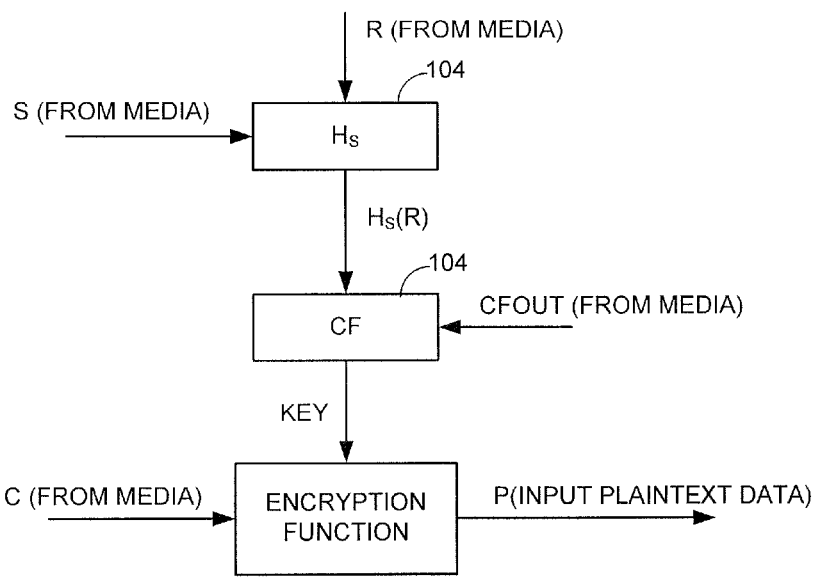
FIG. 11C is a flow sequence to illustrate processing of data by the data manager of FIG. 5 during a subsequent data read operation.

The subsequent reading of the plaintext data is represented in FIG. 11C. The R, S and CFOUT values are retrieved from the memory 201 and decoded to reveal the encryption key K. The encryption key K is thereafter applied, using the encryption function of the engine 250 (FIG. 10) to reveal and output the originally stored plaintext P.

Figure 11D:
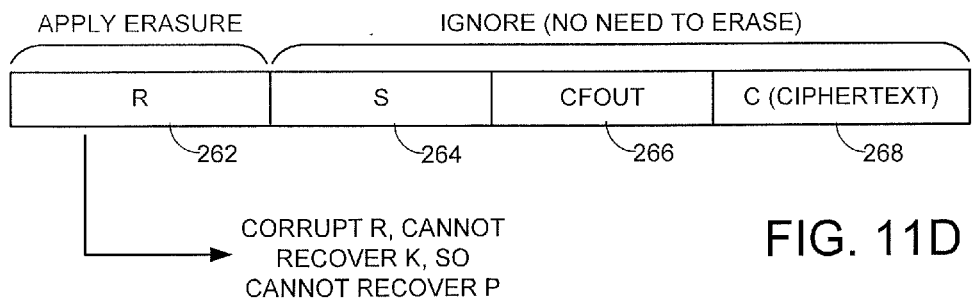
FIG. 11D depicts operation of the data manager during a subsequent data shredding operation in accordance with some embodiments.

To shred the plaintext P, an erasure operation is applied to the R random data bits in memory location 262, as represented in FIG. 11D. As before, there is no need to further erase the remaining data (S, CFOUT and/or C) although erasure can be applied to these locations as well. Because R is corrupted, an attacking party cannot successfully recover the encryption key K, and therefore cannot decrypt the plaintext P.

While the foregoing embodiments can be readily adapted to provide secure shredding of data in a variety of operational environments, further features that can enhance the secure shredding of data will now be discussed.

By storing all of the R bits in a single block, there is a risk that the particular physical block in which the R bits are stored will be subjected to a physical block failure and therefore the system cannot erase the R bits. Accordingly, further embodiments employ secret sharing techniques divide up the random bits in R and distribute these to different memory blocks.

Figure 12:
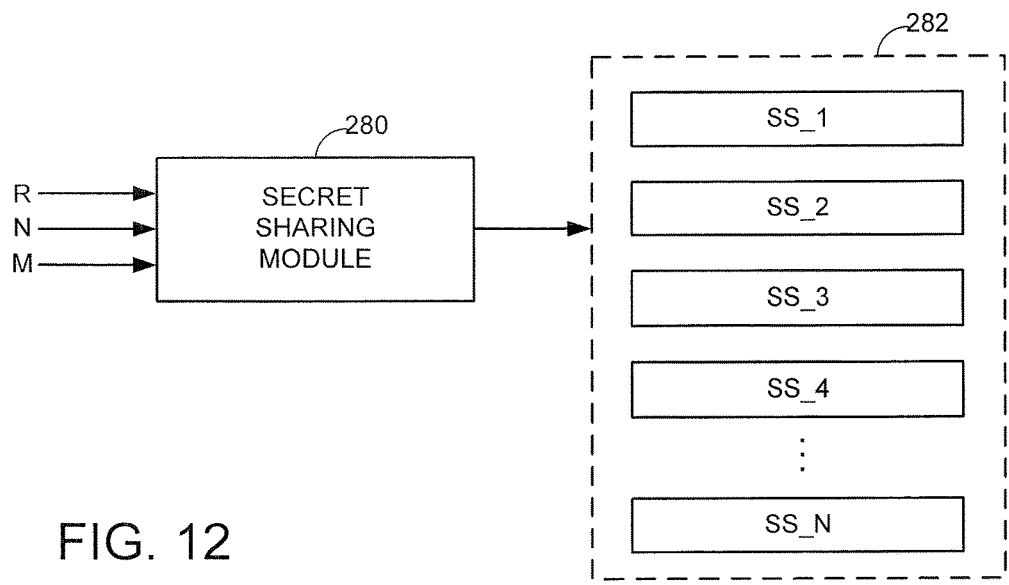
FIG. 12 shows a secret sharing module which utilizes secret sharing techniques for the distributed blocks.

FIG. 12 shows a secret sharing module 280 operable in some embodiments to carry out secret sharing upon a random sequence R. Those skilled in the art will recognize that secret sharing constitutes a data transformation approach where a secret is divided up into a selected number of parts, or shares, and the shares are distributed to different recipients (e.g., memory locations, etc.). A selected algorithm is used to configure the secrets so that a selected subset of the shares are required in order to reconstitute the entire secret.

Stated another way, if the plural number N represents the total number of shares (subblocks), and M is the selected threshold number less than N, then the recovery of at least M subblocks is sufficient to reconstitute the contents of the original secret, and M−1 subblocks is insufficient to enable reconstitution of the contents of the original secret.

A variety of well-known secret sharing techniques can be used by the secret sharing module 280 based on input values of R, N and M. As shown in FIG. 12, the secret sharing module 280 generates a data set 282 with N separate shares SS_1 to SS_N. Each of the shares is stored in a different physical block of memory.

To read the protected data, the shares are recovered and processed by the module 280 to return the original sequence R, and then the recovered sequence R is used as discussed above to reveal the secret. To shred the protected data, at least N−M+1 of the shares are subjected to erasure. It is contemplated that all of the shares will be subjected to erasure, but at least N−M+1 of the shares need to have been altered by the erasure process in order to successfully shred the secret data. Depending on the relative values of N and M, this provides a highly effective way to ensure that the data are in fact shredded since many block failures will be necessary to prevent the corruption of R.

Figure 13:
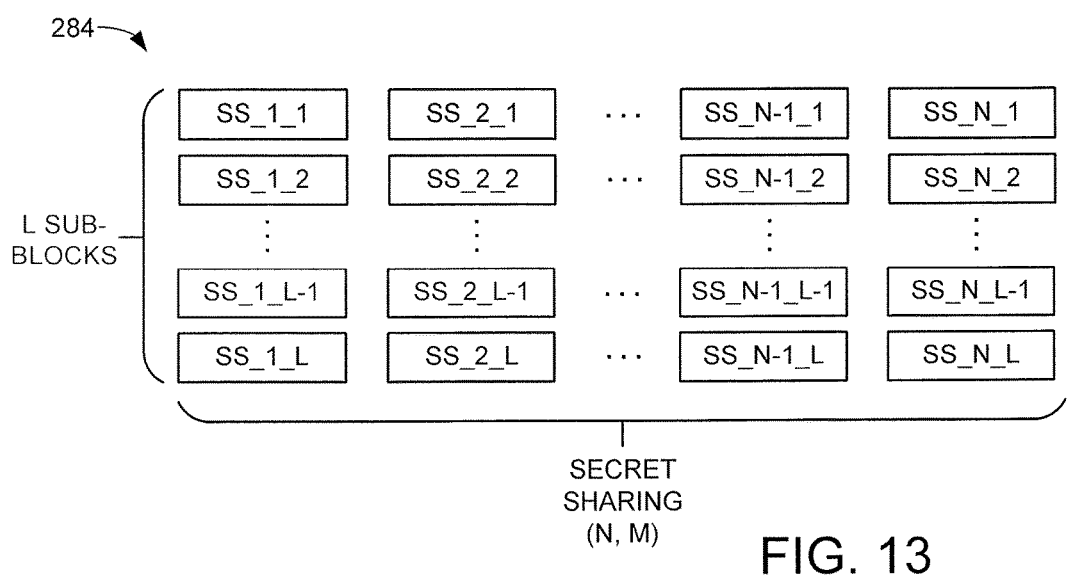
FIG. 13 is another secret sharing scheme that can be employed by the module of FIG. 17.
Figure 14:
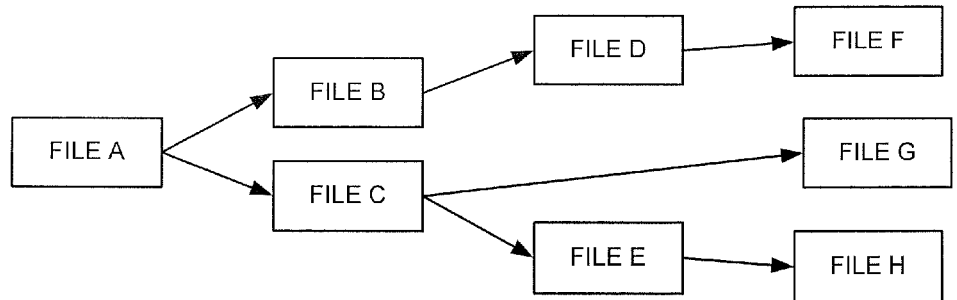
FIG. 14 shows a family of files upon which the data manager can efficiently apply data shredding.

FIG. 13 shows a two-dimensional secret sharing output 284 from the module 280. The secret sharing technique divides the original data R into L subblocks, and each of the L subblocks is in turn subjected to a separate secret sharing scheme. In this way, the secret sharing scheme can be broken up into smaller pieces and secret sharing can be applied to each piece.

The foregoing techniques are suitable for protecting a wide variety of multi-bit secrets such as in the form of encryption keys, system parameter information, sensitive data, etc. The techniques can further be extended to securely shred groups of data sets, such as multiple versions of a selected data block.

Figure 15:
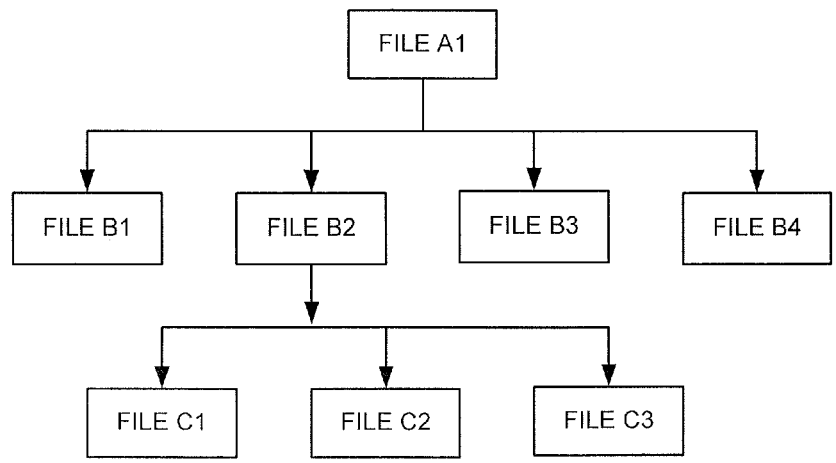
FIG. 15 shows another family of files upon which the data manager can efficiently apply data shredding.
Figure 16:
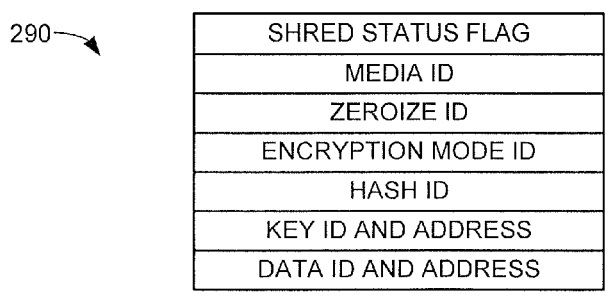
FIG. 16 is an exemplary data structure for a secure data shredding container to track the status of data stored in accordance with various embodiments.

FIG. 15 represents a number of data files denoted as files A-H arranged in a tree structure with dependencies as shown. Secure shredding can take place for individual files such as file H, or the entire structure by shredding file A. FIG. 16 shows another hierarchy of files, such as a directory structure. The files may be shredded individually, or secure shredding of file A1 can erase all of the files in the structure. The files can be linked by chaining lower level files with dependencies on higher level files. In this way, the destruction of protection bits (e.g., the R bits) used for a higher level file also prevents recovery of the lower level file(s) that use protection bits derived from the higher level files.

FIG. 16 illustrates a data structure 290 that can be adapted to track the status of data sets in a storage memory. The data structure 290 is characterized as a secure data shredding container and may be maintained as a part of a larger data control structure in the system. Each container generally describes the status of each data set separately protected in the system. The data structure 290 can take a variety of forms other than that represented in FIG. 16, and may constitute a relatively small size (e.g., on the order of around 20-30 bytes).

The example container 290 includes a number of fields each constituting one or more bits. A shred status flag provides a Boolean indication (e.g., flag bit) of whether the associated contents described by the container have been shredded. A media identifier (ID) field identifies the storage device/memory in which the data are stored. A zeroize ID field indicates the zeroizing algorithm applied during a secure shred. An encryption mode ID field identifies the mode of encryption (where employed), such as described above with the encryption engine 250 in FIG. 10. Examples include various types of counter-mode (CTR) encryption, cipher-block chaining (CBC) encryption, etc.

A hash ID field identifies the universal hash family used to supply the hash functions for the data set. Key ID and address fields provide a variety of data relating to the implementation of secret sharing and modes used (as applicable), and the locations of the various data sets (e.g., "keys" or "control data"). Addresses may be defined in a variety of ways including logical block addressing, physical block addressing, sectors, cylinders, rows, offsets, etc. Data ID and address fields provide corresponding data to identify the types and location(s) of the protected data (e.g., the S, CFOUT, ciphertext, etc.).

It is contemplated that the container data structure 290 can be adapted for use in a variety of data storage environments, from single device implementations (e.g., individual HDDs, SSDs, etc.) to multi-device storage enclosures including distributed object storage systems where objects (partitions) are replicated multiple times and stored in geographically distributed zones.

Figure 17:
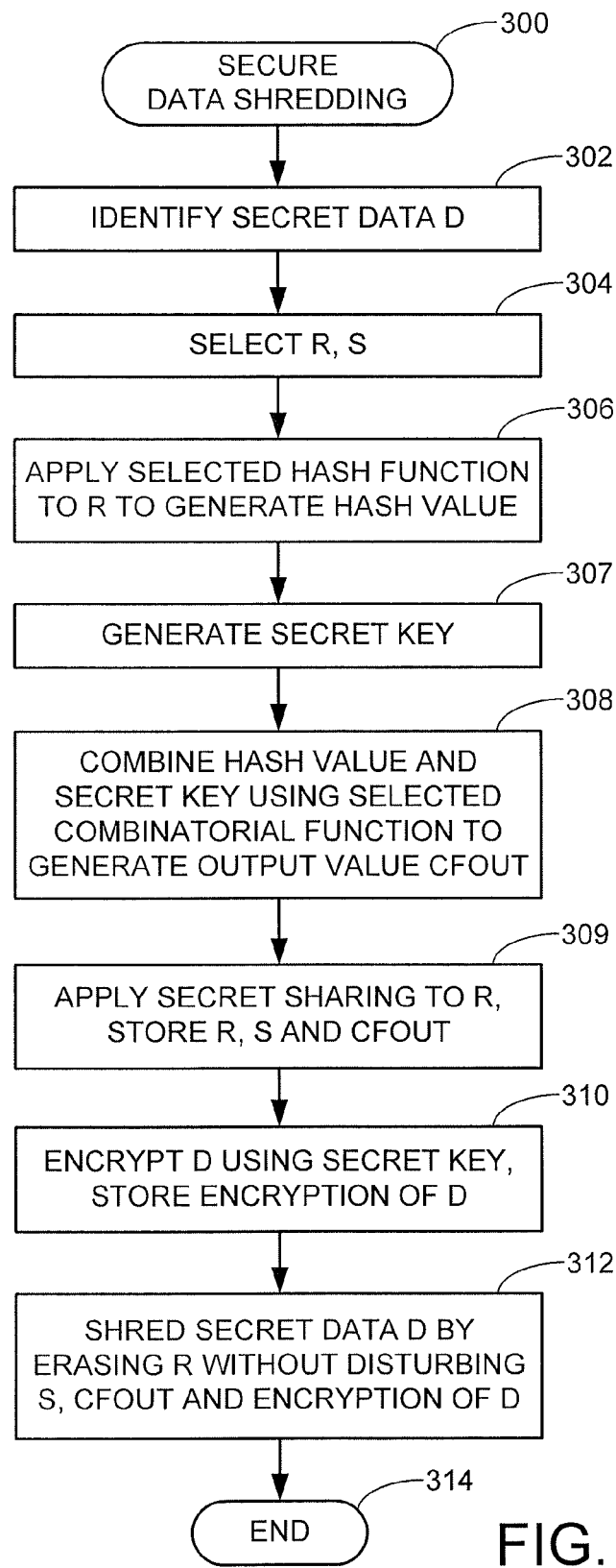
FIG. 17 is a flow chart for a secure data shredding routine illustrative of steps carried out in accordance with various embodiments.

FIG. 17 provides a flow chart for a secure data shredding routine 300 to summarize the foregoing discussion. It will be contemplated that the routine is performed under the direction of a data manager such as 200 in FIG. 5 in a data storage device to control the storage of data in an associated non-volatile memory such as 201 in FIG. 5. Various steps may be omitted, added, changed, performed in a different order, etc. so the routine 300 is merely exemplary and is not limiting to the scope of the present disclosure.

A set of multi-bit secret data D is initially identified at step 302. As discussed above, this can take any number of forms such as a relatively small set of confidential information, an encryption key used to encrypt a larger set of user data, configuration data for the device, etc. Ultimately, a goal of the routine is to securely store the secret data D (in encoded form) in the memory in such a way as to be able to subsequently securely shred the data to prevent subsequent recovery.

Control parameters for use in encoding the secret D are next selected at step 304. These parameters include a multi-bit random sequence R and a multi-bit random sequence S. As discussed above, R has a length selected in relation to a number of parameters including the length of D, various estimated or specified probabilities of erasure and/or block failure, the construction of the memory, etc. S is a selection value to select one of an available population of universal hash functions.

At step 306, the associated hash function $H_s$ corresponding to S is selected and used to generate a hash value $H_s(R)$ through application of the hash function to R. A secret key is generated at step 307. The output hash value and the secret key are combined using a selected combinatorial logic function to generate an output value CFOUT at step 308.

Secret sharing is applied to R, and the shares of R and the values S and CFOUT are stored to the memory in suitable memory locations at step 309. The secret data D are encrypted using the secret key at step 310, and the encryption of D is stored. A data container such as 290 may be formed at this time and stored to track the status of the encoded data set. Read operations are carried out thereafter as required to retrieve the data to a requesting host device.

Thereafter, a shred command is received and the secret data D are shredded by erasing R without disturbing S, CFOUT and the encryption of D at step 312. The command is executed by scheduling and executing an erasure operation upon the data bits corresponding to R. As discussed above, in a disc-based memory as in FIG. 2 this may involve the overwriting of the existing data sector(s) 132 in which the R data bits are stored.

In a flash memory as in FIGS. 3 and 4A, this may involve the application of an erasure operation upon the flash memory cells in which the R bits are stored to remove the accumulated charge from these cells. In a rewritable semiconductor memory such as in FIGS. 3 and 4B, this may involve writing each of the associated cells to a selected programming state (e.g., 0, etc.), the overwriting of these cells with random data, etc.

As discussed above, any number of erasure operations, including multiple cycling of erasures (with or without overwrites) can be applied. It is contemplated, however, that a single erasure will be sufficient to shred the secret data D through sufficient corruption of the original values of the random bits in R.

The remaining data (e.g., S, CFOUT, ciphertext, code words, etc.) may remain undisturbed during this erasure process, although an erasure may be applied to these locations as well. The locations of these various data bits may be marked as stale data so that the locations can be scheduled for erasure at a later time during normal memory recovery (e.g., garbage collection) operations. Where used, the control data structure such as container 290 in FIG. 16 can be updated to indicate the completion of the secure shredding operation, and a notification can be supplied (as in FIG. 5) to the requesting host that the shredding operation has been completed. The notification can also be used as an auditing tool to confirm that a secure shred operation has taken place. The routine then ends at step 314.

It will be appreciated that the various embodiments presented herein can provide a number of benefits. Erasable memories such as flash memory arrays are particularly suited to the use of these techniques, since garbage collection operations are often required in order to access and securely erase data in which the data are located. By storing the random bits R in a different location (including a different form of memory, such as NOR flash, STRAM, RRAM, PCRAM, etc.), this separate location can be easily accessed and erased, thereby eliminating the need to proceed with scheduling a special erasure operation upon the "main" data (e.g., the ciphertext, etc.).

As used herein, the term "random sequence" and the like will be understood consistent with the foregoing discussion to describe "true" random numbers, numbers that are essentially indistinguishable from true random numbers, and pseudo-random numbers.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A computer-implemented method comprising:
    applying a hash function to a multi-bit random string to generate a multi-bit output hash, the multi-bit random string having a total of n bits selected responsive to an estimated probability at any given time that a particular erasure operation applied to a set of data will not actually alter the programmed states of the memory locations of the data in a non-volatile memory;
    using a combinatorial logic function to logically combine the multi-bit output hash with a multi-bit secret to provide a multi-bit output value;
    dividing the multi-bit random string into a plurality of secret shares N where a minimum of M<N secret shares are required to reconstruct the multi-bit random string;
    storing the N secret shares and the multi-bit output value in the non-volatile memory;
    and shredding the multi-bit secret by applying an erasure operation to at least N−M+1 of the N secret shares.

2. The method of claim 1, the data are shredded without applying an erasure operation upon the output value from the combinatorial logic function in the non-volatile memory.

3. The method of claim 1, the hash function is a selected hash function from a family of universal hash functions having a plural number X members, the method further comprising generating a parameterization value from a second multi-bit random string identifying a corresponding value from 1 to X, using the parameterization value to identify the applied hash function, and storing the parameterization value in the non-volatile memory, the secret shredded by applying the erasure operation to the secret shares without applying an erasure operation to the output value or to the parameterization value.

4. The method of claim 1, the secret comprising a symmetric encryption key associated with a selected encryption function, the method further comprising using an encryption engine which enacts the selected encryption function using the symmetric encryption key to generate ciphertext data from a set of input user data, the ciphertext data stored in the non-volatile memory, the secret shredded by applying the erasure operation to the secret shares without applying an erasure operation to the output value or to the ciphertext data.

5. The method of claim 1, wherein the total number of bits n in the random string is greater than a total number of bits in the secret.

6. The method of claim 1, wherein the random string has a total number of bits selected in relation to the average min-entropy of the random string given its residue after an erasure operation to provide a probability of less than 51% of an attacker successfully guessing each bit in the random string after the secure erasure operation.

7. The method of claim 1, wherein the shredding operation comprises applying only a single erasure operation to the memory locations storing the secret shares, and wherein less than all of the bits of the secret shares are reset to a base value responsive to the single erasure operation.

8. The method of claim 1, wherein the n total number of bits of the random string is further selected in relation to a possibility of a failure of a block of the memory to which the secret shares are stored.

9. The method of claim 1, wherein the shredding operation comprises applying multiple erasure operations and writing of random data to the memory locations storing the secret shares.

10. The method of claim 1, further comprising retrieving the secret prior to the shredding operation by combining the secret shares from the non-volatile memory to reconstitute the random string, applying the hash function to the reconstituted random string to generate a second output value, using the combinatorial function to combine the second output value with the output value from the non-volatile memory to generate the secret, and outputting the secret to a host device.

11. The method of claim 1, the multi-bit secret is a first secret associated with a first data file stored in the non-volatile memory and the multi-bit random string is a first multi-bit random string, the method further comprising storing a second secret in the non-volatile memory by:
    providing a second multi-bit random string;
    logically combining the second multi-bit random string with the first multi-bit random string to generate a third multi-bit random string;
    applying a selected hash value to the third multi-bit random string to generate a second hash;
    logically combining the second hash with the second secret to generate a second output value; and
    storing the second multi-bit random string and the second output value in the non-volatile memory, the shredding of the first secret by the application of the erasure operation to the secret shares concurrently shredding the second secret without application of an additional erasure operation to another location of the memory.

12. The method of claim 1, the non-volatile memory comprising a flash memory.

13. The method of claim 1, the combinatorial logic function comprising an exclusive-or (XOR) function.

14. An apparatus comprising:
    a non-volatile memory;
    a processing circuit configured to implement the following:
        a hash function block which applies a selected hash function from a family of universal hash functions to a multi-bit random string to generate a multi-bit output hash, the multi-bit random string having a total of n bits selected responsive to an estimated probability at any given time that a particular erasure operation applied to a set of data will not actually alter the programmed states of the memory locations of the data in a non-volatile memory and an estimated probability of a block failure of a portion of the non-volatile memory;

a combinatorial logic block which applies a selected combinatorial logic function to logically combine the multi-bit output hash with a multi-bit secret to provide a multi-bit output value;

a secret sharing module which generates a plurality of N secret shares from the multi-bit random string using an (N, M) secret sharing scheme where N−M shares are required to reconstitute the multi-bit random string;

a write control block which directs storage of the N secret shares in a first location of the non-volatile memory and directs storage of the multi-bit output value to a different, second location of the non-volatile memory;

and a data shredding block which directs an erasure operation upon the N secret shares in the first location of the memory to shred the multi-bit secret from the non-volatile memory without applying an erasure operation upon the multi-bit output value in the second location of the non-volatile memory.

15. The apparatus of claim 14, wherein the secret comprises a symmetric encryption key associated with a selected encryption function, wherein the apparatus further comprises an encryption engine which enacts the selected encryption function using the symmetric encryption key to generate ciphertext data from a set of input user data, wherein the generated ciphertext data are stored in a third location of the non-volatile memory, and wherein the secret is shredded by applying the erasure operation to the first location without applying an erasure operation to the second and third locations.

16. The apparatus of claim 14, wherein the total number of bits n in the multi-bit random string is greater than and is selected in relation to a total number of bits in the multi-bit secret.

17. The apparatus of claim 14, wherein the secret shares are each stored in a separate physical block of memory in the first location of the non-volatile memory so that the first location in the non-volatile memory is non-contiguous.

18. The apparatus of claim 14, the non-volatile memory comprising a flash memory comprising a plurality of erasure blocks, the secret shares distributed among a plural number of the erasure blocks.

19. An apparatus comprising:
a non-volatile memory;
a read/write circuit configured to write data to and to read data from the non-volatile memory;
and a data manager circuit connected to the read/write circuit, the data manager circuit configured to encode a multi-bit secret D for storage to the non-volatile memory, the data manager circuit comprising:
a random number generator which generates random numbers;
an R-length selection logic circuit which selects a multi-bit random string R of n bits in length using the random numbers from the random number generator, the R-length selection logic circuit identifying the value n responsive to an estimated probability at any given time that a particular erasure operation applied to a set of data will not actually alter the programmed states of the memory locations of the data in the non-volatile memory;
a hash function block which applies a selected hash function from a family of universal hash functions to the multi-bit random string R to generate a multi-bit output hash Hs(R);
a combinatorial logic block which applies a selected combinatorial logic function to logically combine the multi-bit output hash Hs(R) with the multi-bit secret D to provide a multi-bit output value CFOUT;
a secret sharing block which processes the random string R to generate a plurality of N shares where at least N−M shares are required to reconstitute the multi-bit random string;
a write block which directs the read/write circuit to store the N secret shares in a first location of the non-volatile memory and to store the multi-bit output value CFOUT to a different, second location of the non-volatile memory;
and a data shredding block which directs the read/write circuit to execute an erasure operation upon at least N−M+1 of the N secret shares in the first location of the non-volatile memory to shred the secret D from the non-volatile memory without erasing the multi-bit output value CFOUT from the non-volatile memory.

20. The apparatus of claim 19, the memory comprising a flash memory array formed of a plurality of erasure blocks, each secret share N stored in a different one of the plurality of erasure blocks.

* * * * *